(12) United States Patent
Glugla et al.

(10) Patent No.: US 9,267,484 B2
(45) Date of Patent: Feb. 23, 2016

(54) METHOD AND SYSTEM FOR PRE-IGNITION CONTROL

(71) Applicant: Ford Global Technologies, LLC, Dearborn, MI (US)

(72) Inventors: Chris Paul Glugla, Macomb, MI (US); Robert Sarow Baskins, Grass Lake, MI (US); Chris Richard Weber, Plymouth, MI (US); James Matthew Kindree, South Lyon, MI (US); Timothy Earle, London (GB)

(73) Assignee: Ford Global Technologies, LLC, Dearborn, MI (US)

(*) Notice: Subject to any disclaimer, the term of this patent is extended or adjusted under 35 U.S.C. 154(b) by 348 days.

(21) Appl. No.: 13/829,681

(22) Filed: Mar. 14, 2013

(65) Prior Publication Data

US 2014/0261318 A1   Sep. 18, 2014

(51) Int. Cl.
| | |
|---|---|
| *F02P 5/04* | (2006.01) |
| *F02D 41/30* | (2006.01) |
| *F02D 41/10* | (2006.01) |
| *F02D 35/02* | (2006.01) |
| *F02P 5/153* | (2006.01) |
| *F02D 41/04* | (2006.01) |

(52) U.S. Cl.
CPC .................. *F02P 5/04* (2013.01); *F02D 35/027* (2013.01); *F02D 41/10* (2013.01); *F02D 41/30* (2013.01); *F02D 41/045* (2013.01); *F02D 2200/602* (2013.01); *F02P 5/153* (2013.01); *Y02T 10/40* (2013.01)

(58) Field of Classification Search
CPC ............ F02P 5/04; F02P 5/153; F02D 41/30; F02D 41/10; F02D 35/027; F02D 41/045; F02D 2200/602; Y02T 10/40
USPC ........ 123/406.11–406.76; 701/101–104, 111; 73/35.01–35.06
See application file for complete search history.

(56) References Cited

U.S. PATENT DOCUMENTS

| | | | |
|---|---|---|---|
| 5,905,193 A | 5/1999 | Hashizume et al. | |
| 6,105,552 A | 8/2000 | Arisawa et al. | |
| 7,128,048 B2 | 10/2006 | Yamoaka et al. | |
| 7,673,614 B2 | 3/2010 | Inada et al. | |
| 8,073,613 B2 | 12/2011 | Rollinger et al. | |
| 8,171,912 B2 | 5/2012 | Glugla et al. | |
| 8,260,530 B2 | 9/2012 | Rollinger et al. | |
| 2009/0308146 A1 | 12/2009 | Gautrot et al. | |
| 2011/0139118 A1 | 6/2011 | Glugla et al. | |
| 2011/0139120 A1* | 6/2011 | Rollinger et al. | ............. 123/436 |
| 2011/0202260 A1 | 8/2011 | Cunningham et al. | |
| 2013/0034841 A1 | 2/2013 | Seubert et al. | |

OTHER PUBLICATIONS

Glugla, Chris P. et al., "Engine Control for a Liquid Petroleum Gas Fueled Engine," U.S. Appl. No. 14/019,191, filed Sep. 5, 2013, 54 pages.

* cited by examiner

*Primary Examiner* — Stephen K Cronin
*Assistant Examiner* — Xiao Mo
(74) *Attorney, Agent, or Firm* — Julia Voutyras; Alleman Hall McCoy Russell & Tuttle LLP

(57) ABSTRACT

Methods and systems are provided for pre-ignition control. A pre-ignition mitigating enrichment is deactivated in response to a tip-out but reactivated in response to a subsequent tip-in. By preemptively enriching the engine, repeated pre-ignition due at subsequent tip-ins is reduced.

26 Claims, 6 Drawing Sheets

METHOD AND SYSTEM FOR PRE-IGNITION CONTROL

FIELD

The present description relates generally to methods and systems for controlling a vehicle engine to reduce the occurrence of pre-ignition.

BACKGROUND/SUMMARY

Boosted engines operating at heavy loads and low engine speeds may be prone to pre-ignition combustion events. The early combustion due to pre-ignition can cause very high in-cylinder pressures, and can result in combustion pressure waves similar to combustion knock, but with larger intensity. Strategies have been developed for prediction and/or early detection of pre-ignition based on engine operating conditions. Additionally, following detection, various pre-ignition mitigating steps may be taken.

In one example, as shown by Rollinger et al. in U.S. Pat. No. 8,073,613, in response to a pre-ignition event, the affected cylinder is enriched. In addition, an engine load may be reduced. Further still, the enrichment and load limiting is adjusted based on the pre-ignition history of the engine with a more aggressive enrichment and load limiting applied when there is recurrent pre-ignition as compared to sporadic pre-ignition.

However, the inventors herein have identified a potential issue with such an approach. Specifically, the enrichment is deactivated in response to a tip-out leading to an incomplete pre-ignition mitigating enrichment. For example, if an engine is operated at a relatively higher engine speed and load condition, the engine can become very hot. Subsequent operation at lower engine speed and high load can produce repeated pre-ignition events every time a throttle tip-in is performed to increase air mass and torque. The approach of '613 mitigates low speed pre-ignition by enriching the cylinder(s) for a short period of time. However, if the pedal or throttle request is decreased (e.g., due to a tip-out event) during the mitigating action, the enrichment strategy may be abandoned. A subsequent tip-in to even low or mid loads may produce pre-ignition events. In particular, pre-ignition may be triggered during a subsequent tip-in to loads even lower than those that typically trigger pre-ignition. This may not only degrade engine performance but also reduce engine life.

To at least partly address the above issue, a method of controlling an engine is provided. The method comprises, during a tip-in, in response to an indication of pre-ignition, enriching the engine until a subsequent tip-out, and if a number of enrichment cycles between the tip-in and the tip-out is lower than a threshold, enriching the engine during a subsequent tip-in. In this way, enrichment responsive to pre-ignition induced during a tip-in may be completed and further pre-ignition may be mitigated.

For example, in response to an indication of pre-ignition during a tip-in event, an enrichment profile may be determined. This may include a number of enrichment cycles as well as a degree of richness of each cycle, to be performed to mitigate the pre-ignition. If a tip-out event occurs, the enrichment may be stopped or deactivated. If the tip-out occurs after the number of enrichment cycles are performed, the enrichment profile may be considered completed. However, if the tip-out occurs before the determined number of enrichment cycles are performed, the enrichment profile may be considered incomplete. The controller may then store the remaining number of enrichment cycles in its memory. During a subsequent tip-in following the tip-out, the remaining number of enrichment cycles may be executed, even if an indication of pre-ignition is not received during the subsequent tip-in. This allows the enrichment initiated responsive to the initial tip-in to be completed or reactivated during the subsequent tip-in, and further pre-ignition events to be preemptively addressed.

Alternatively, the controller may lower a pre-ignition threshold during the subsequent tip-in and perform the remainder of the enrichment when the engine conditions cross the lower threshold. For example, the remainder of the enrichment may be triggered during the subsequent tip-in at lower engine load conditions than engine load conditions where pre-ignition typically occurs. The controller may then complete the enrichment until the remaining number of enrichment cycles have been depleted.

In this way, pre-ignition responsive to repeated tip-ins may be reduced. By continuing enrichment initiated, but not completed, during an initial tip-in, at a subsequent tip-in, sufficient combustion chamber cooling can be provided. By preemptively reactivating the enrichment during the subsequent tip-in, before an indication of pre-ignition is received, the combustion surfaces can be maintained below critical temperatures and thermal overloading during the subsequent tip-in can be reduced. In this way, not only is the incipient pre-ignition event mitigated, but also, the likelihood of further pre-ignition events is reduced. Overall engine performance and life is extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
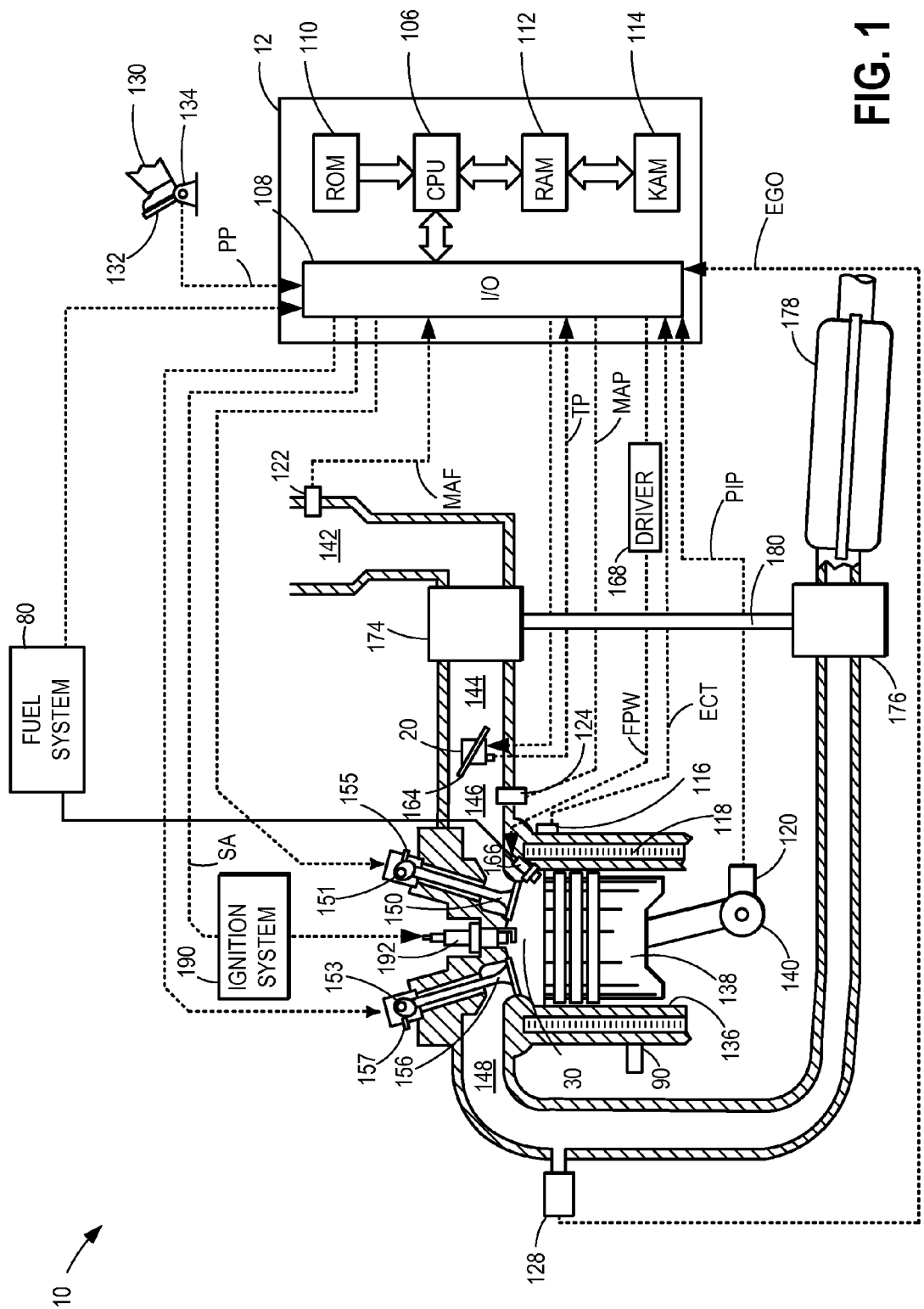
FIG. 1 shows an example combustion chamber.
Figure 4:
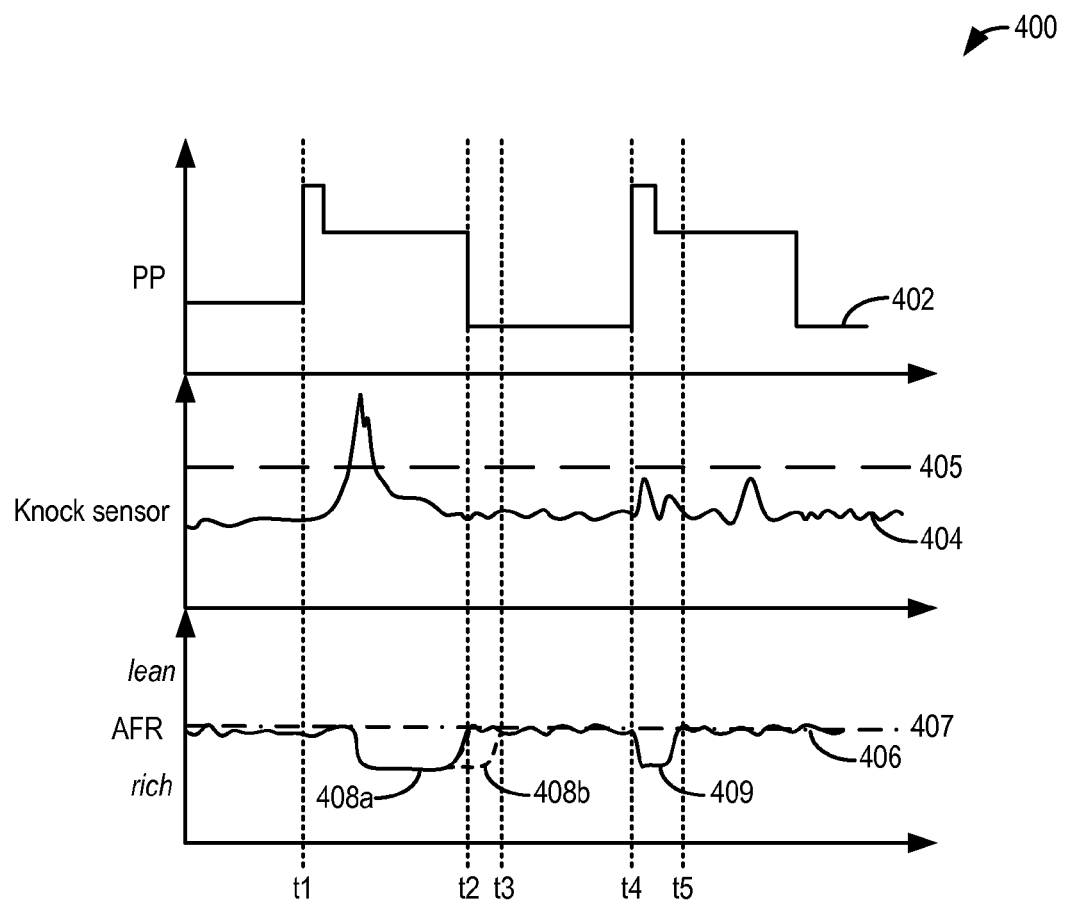
FIGS. 4-6 show example enrichment profiles, according to the present disclosure.
Figure 5:
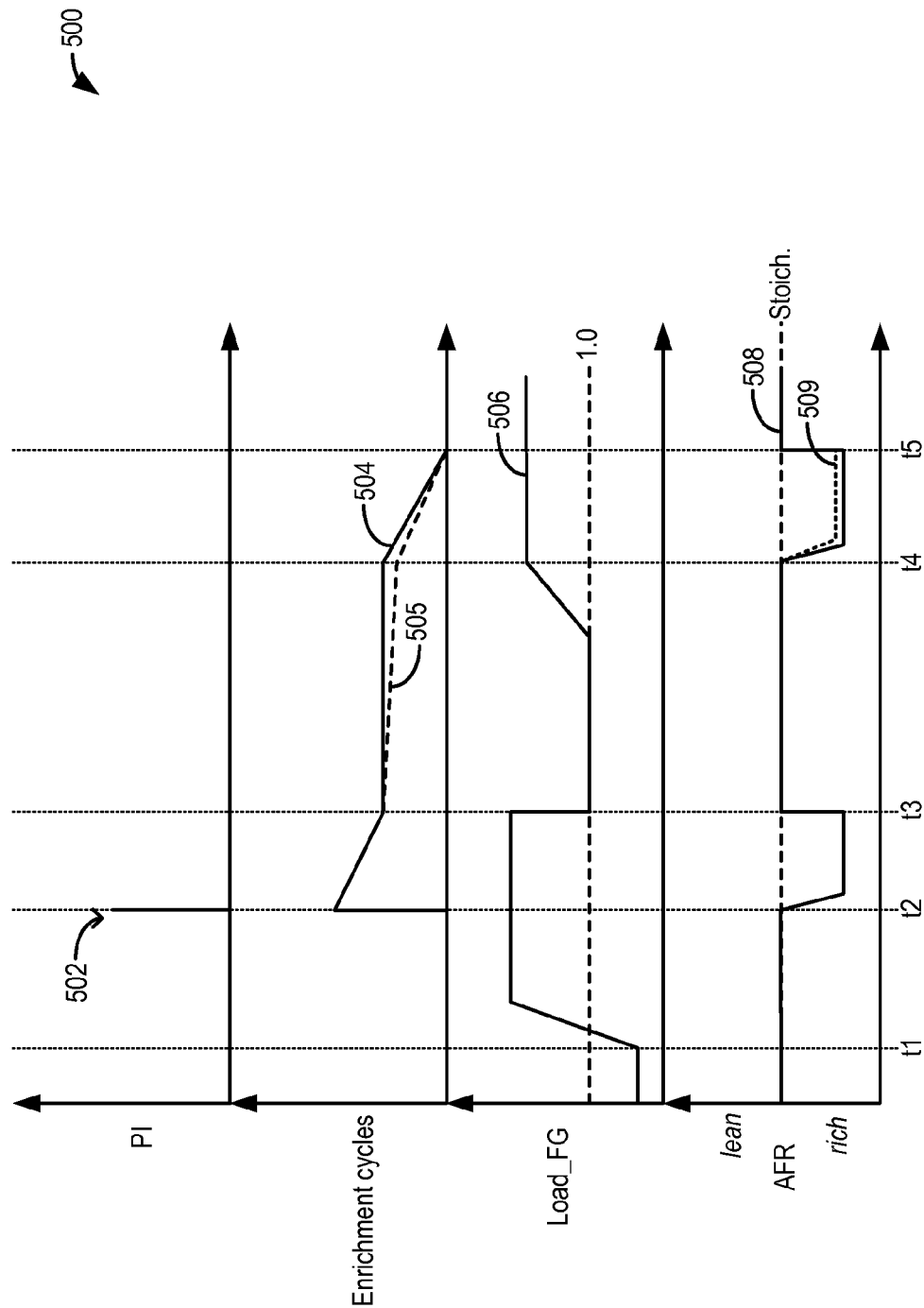
Figure 6:
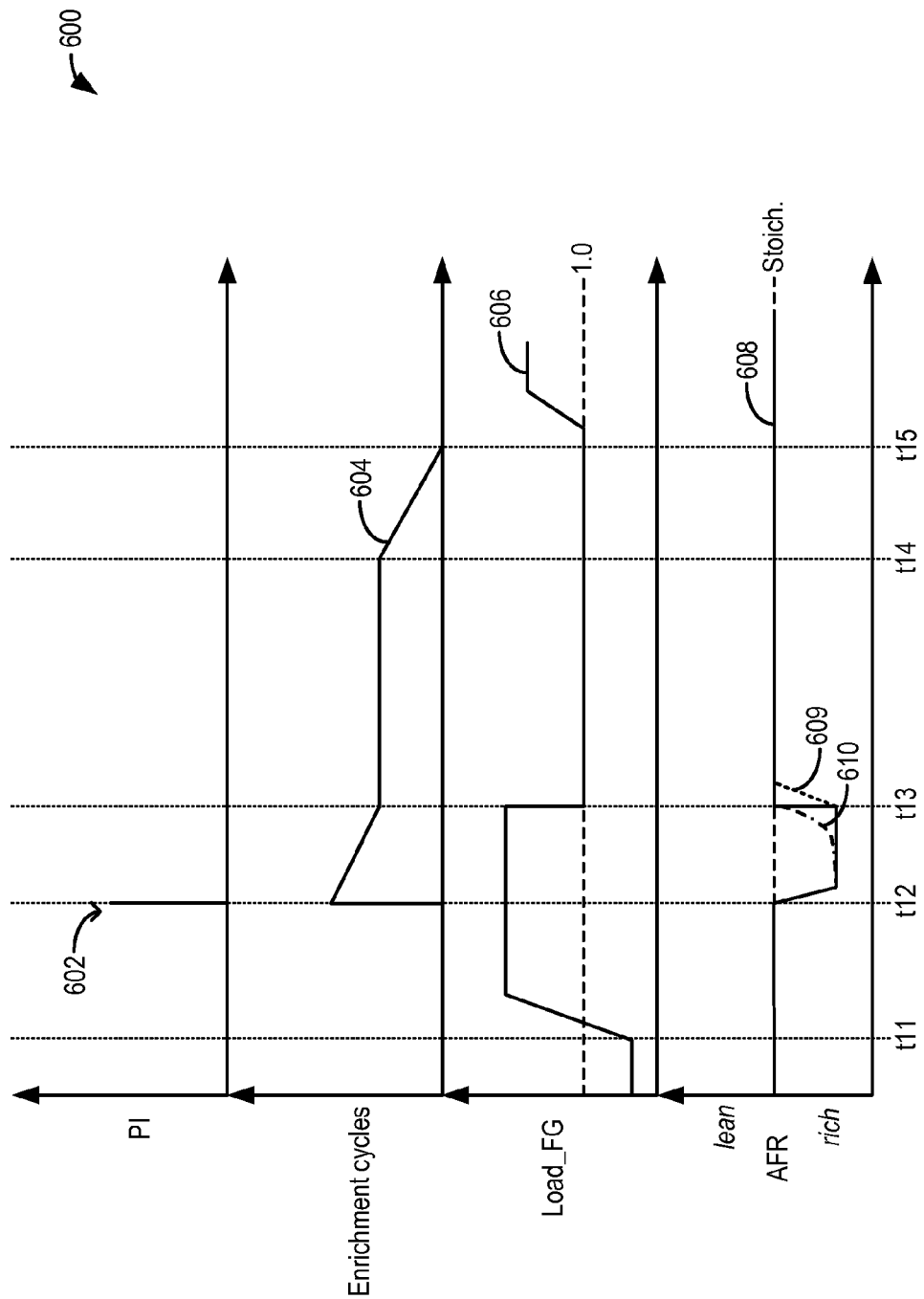

The following description relates to systems and methods for reducing pre-ignition that may occur during recurring tip-ins in an engine, such as in the engine system of FIG. 1. In response to an initial pre-ignition event during a tip-in, an enrichment may be initiated. If the enrichment is not completed due to a tip-out event, the enrichment may be completed over one or more subsequent tip-in events, even if there is no indication of pre-ignition over those tip-in events. An engine controller may be configured to perform a control routine, such as the example routine of FIGS. 2-3, to monitor an incomplete pre-ignition mitigating enrichment and store a remaining number of enrichment cycles in the controller's memory. The controller may then complete the pending enrichment cycles over one or more subsequent tip-in events. The controller may also lower a pre-ignition threshold responsive to which enrichment is initiated during the subsequent tip-ins to lower thermal overloading and reduce the likelihood of recurrent pre-ignition during repeated tip-in events. Example pre-ignition mitigating enrichments are shown at FIGS. 4-6.

FIG. 1 depicts an example embodiment of a combustion chamber or cylinder of an internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder. Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 80 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that in an alternate embodiment, injector 166 may be a port injector providing fuel into the intake port upstream of cylinder 30.

As described above, FIG. 1 shows only one cylinder of a multi-cylinder engine. As such each cylinder may similarly include its own set of intake/exhaust valves, fuel injector(s), spark plug, etc.

Fuel tanks in fuel system 80 may hold fuel with different fuel qualities, such as different fuel compositions. These differences may include different alcohol content, different octane, different heat of vaporizations, different fuel blends, and/or combinations thereof etc.

Engine 10 may further include one or more knock sensors 90 distributed along an engine block, or coupled to individual cylinders (as shown). When included, the plurality of knock sensors may be distributed symmetrically or asymmetrically along the engine block. Knock sensor 90 may be an accelerometer, or an ionization sensor. An engine controller may be configured to detect and differentiate abnormal combustion events due to cylinder knocking from those indicative of cylinder pre-ignition based on the output (e.g., signal timing, amplitude, intensity, frequency, etc.) of knock sensor 90, and further based on the output of a crankshaft acceleration sensor. For example, a cylinder pre-ignition event may be determined based on a cylinder knock signal estimated in a first, earlier window (such as a first window before a spark ignition event in the cylinder) being larger than a first, higher threshold, while a cylinder knock event may be determined based on a cylinder knock signal estimated in a second, later window (such as a second window after a spark ignition event in the cylinder) being larger than a second, lower threshold. In one example, the windows in which the knock signals are estimated may be crank angle windows.

Mitigating actions taken by the engine controller to address knock may differ from those taken by the controller to address pre-ignition. For example, knock may be addressed using spark ignition timing adjustments (e.g., spark retard) and EGR, while pre-ignition may be addressed using load-limiting, fuel enrichment (as elaborated in FIGS. 2-6), fuel enleanment, or a combination thereof.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10 including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. Other sensors such as pressure, temperature, air/fuel ratio, and composition sensors may be coupled to various locations of the engine.

Storage medium read-only memory 110 can be programmed with computer readable data representing instructions executable by processor 106 for performing the methods described below as well as other variants that are anticipated but not specifically listed.

The controller may receive input data from the various sensors, process the input data, and trigger various actuators in response to the processed input data based on instruction or code programmed therein corresponding to one or more routines. Example actuators that are adjusted include fuel injector 166, throttle 20, turbine 176, and cams 151, 153. Example control routines are described herein with reference to FIGS. 2-3.

Figure 2:
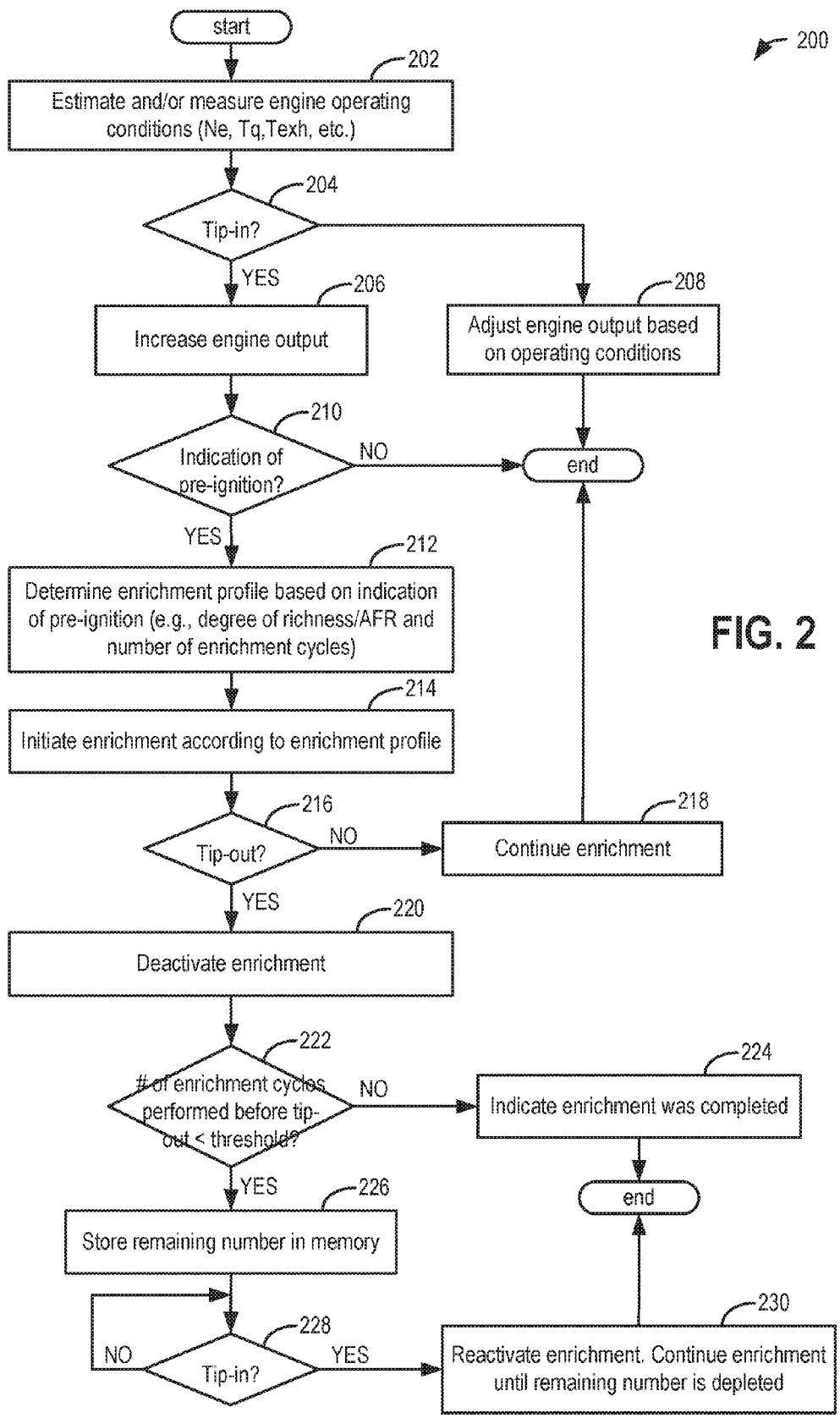
FIGS. 2-3 shows high level flow charts for adjusting a pre-ignition mitigating enrichment during repeated tip-ins.

Now turning to FIG. 2, an example routine 200 is depicted for adjusting a pre-ignition mitigating engine enrichment based on tip-in events following an initial pre-ignition event. The routine allows thermal loading of the engine to be reduced, thereby lowering the likelihood of further pre-ignition events.

At 202, engine operating conditions may be estimated and/or measured. These may include, for example, engine speed and load, torque, boost, manifold pressure (MAP), manifold aircharge temperature (MCT), exhaust temperature, air-fuel ratio (lambda), fuel octane content, etc.

In some embodiments, a pre-ignition history of the engine may also be retrieved from a look-up table stored in the controller's memory. The look-up table may be updated at regular intervals (e.g., every engine cycle, every 50 miles, every hour, etc.), or in response to an occurrence of cylinder pre-ignition. The engine pre-ignition (PI) count may include a PI count for each cylinder may include details such as an estimate of a total number of pre-ignition events in the cylinder over the present trip, or engine cycle (e.g., a cylinder trip PI count). The engine PI count may further include an estimate of the total number of pre-ignition events in the cylinder over the lifetime of engine operation (e.g., cylinder lifetime PI count). As such, each cylinder's PI count may represent the given cylinder's pre-ignition history, and may correlate with each cylinder's propensity for further pre-ignition events.

At 204, a tip-in event may be confirmed. For example, it may be determined if a vehicle operator has demanded increased torque by applying the accelerator pedal. If a tip-in event is not confirmed, at 208, the routine includes adjusting the engine output based on the operating conditions. For example, a nominal torque may be output based on the operating conditions.

If a tip-in event is confirmed, the routine includes increasing engine torque output at 206. For example, boost levels may be increased, throttle opening may be increased, and/or intake manifold air flow may be increased. Fuel injection may be increased based on the increased aircharge to maintain engine operation around stoichiometry.

As such, during boosted engine operations at heavy loads and low engine speeds, the engine can pre-ignite even before spark is initiated in the engine. The resulting mega-knock combustion events can cause very high in-cylinder pressures, and can result in combustion pressure waves similar to combustion knock, but with significantly larger intensity. These combustion waves can degrade engine performance and component life.

In some cases, if the engine is operated at relatively higher speed and load conditions, the engine can become hot and subsequent operation at lower engine speeds and high loads can produce repeated pre-ignition events. For example, every time the operator tips-in after operating the engine at relatively high speed and load conditions, the throttle is tipped-in to increase air mass and torque, and repeated pre-ignition events can occur.

Accordingly, at 210, following the increase in engine output, it may be determined whether there is an indication of pre-ignition. In one example, the indication of pre-ignition includes the detection of an actual pre-ignition event, though in other examples, the indication may include the determination of a likelihood of pre-ignition (before the pre-ignition event actually occurs). As elaborated with reference to FIG. 1, an engine controller may detect abnormal combustion events related to pre-ignition, and differentiate them from cylinder knocking events, based on the output of one or more engine knock sensors. As one example, an indication of pre-ignition may be confirmed in response to the output of the knock sensor, estimated in a window before a spark ignition event, being higher than a threshold. If an indication of pre-ignition is not confirmed, the routine may be end.

It will be appreciated that while the routine of FIG. 2 depicts a pre-ignition event occurring during high engine loads following a tip-in, in other examples, the pre-ignition event may occur during other high engine load-low engine speed conditions.

In response to an indication of pre-ignition received during a tip-in, the engine may be enriched until a subsequent tip-out. For example, the pre-ignition affected cylinder(s) may be enriched. Additionally, based on the indication of pre-ignition (e.g., how large the output of the knock sensor is), as well as the pre-ignition history of the engine, one or more additional cylinders, including cylinders not affected by pre-ignition, may be enriched. By enriching the engine in response to the indication of pre-ignition, in-cylinder temperatures may be rapidly lowered, reducing the thermal loading of the engine and reducing the risk of further pre-ignition events.

Specifically, at 212, an enrichment profile including details about the enriching may be determined based on the indication of pre-ignition. For example, a degree of enrichment and a number of enrichment cycles may be determined and adjusted based on the indication of pre-ignition. As an example, as the indication of pre-ignition increases (e.g., as the knock sensor output exceeds the threshold), the enrichment may be increased. This may include, for example, increasing a degree of richness of the enrichment to an air-fuel ratio that is more rich than stoichiometry. Additionally, this may include increasing a number of enrichment cycles to be applied in response to the indication of pre-ignition.

At 214, the routine includes initiating the engine enrichment as per the enrichment profile determined at 212. For example, direct fuel injection of a fuel may be increased, in proportion to the amount of air in the engine combustion chambers, to run the engine richer than stoichiometry. The controller may also include a counter (or "piggy bank") for counting the progression of enrichment cycles. In one example, as the number of enrichment cycles completed increases, a progress number on the counter may be increased. As a further example, as the number of enrichment cycles completed increases, a remainder number on the counter, or a remaining number in the "piggy bank" indicating the number of enrichment cycles of the enrichment profile remaining, may be decreased.

At 216, it may be determined whether a tip-out has occurred. For example, it may be determined if the vehicle operator has demanded decreased torque by releasing the accelerator pedal. If a tip-out event is not confirmed, at 218, the routine includes continuing enriching the engine as per the enrichment profile, while increasing the number progress number and decreasing the remainder number on the counter.

As such, during a tip-out event, due to release of the pedal, boost levels may be decreased, throttle opening may be decreased, and intake manifold air flow may be decreased. Thus, if a tip-out is confirmed, at 220 to maintain engine operation around stoichiometry, the pre-ignition mitigating enrichment (initiated in response to the indication of pre-ignition at 210) may be deactivated (if it has not already been completed by the time the tip-out event is confirmed).

At 222, it may be determined if a number of enrichment cycles performed before the tip-out is lower than a threshold. For example, based on the progress number and the remainder number on the controller's counter, it may be determined if all the enrichment cycles of the enrichment profile have been completed. If the number is not lower than the threshold, then at 224, it may be determined that the pre-ignition mitigating enrichment was completed. The threshold applied at 222 may be based on the indication of pre-ignition during the tip-in, the threshold increased as the indication of pre-ignition increases.

If the number of enrichment cycles performed before the tip-out (that is, between the tip-in with the indication of pre-ignition and the subsequent tip-out) is lower than the threshold, the controller may enrich the engine during one or more subsequent tip-ins to complete the enrichment. Specifically, at 226, the controller may store the remaining number of enrichment cycles in its memory. For example, the remaining number may be stored in an enrichment "piggy bank". If a subsequent tip-in is confirmed at 228 (as was confirmed at 204), the controller may deplete the remaining number of enrichment cycles stored in the "piggy bank" during the subsequent tip-in. Specifically, at 230, enrichment may be reactivated and the controller may continue depleting the remaining number of enrichment cycles from the "piggy bank" until all the enrichment cycles are depleted. For example, the enrichment may be continued during the subsequent tip-in until the remainder number on the controller's counter comes to zero, and then the engine may be operated at or around stoichiometry (or an alternate nominal air-fuel ratio that is based on the operating conditions).

It will be appreciated that if the remainder number of enrichment cycles are not depleted during the subsequent (or second) tip-in at 228, for example due to a tip-out occurring before the remainder number is completed, the controller may update the new remainder number in the memory and wait for a third tip-in that follows the second tip-in to deplete the remaining enrichment cycles, and so forth. Thus, the enrichment initiated in response to a change in engine speed-load conditions following the first tip-in (at 204) may be completed over one or more subsequent tip-in events. Alternatively, as elaborated below, the number of enrichment cycles (remaining) may be decayed based on an inference of cylinder cooling.

Enriching the engine during the subsequent tip-in includes enriching during the subsequent tip-in before an indication of pre-ignition is received during the subsequent tip-in. By preemptively employing the enrichment during the subsequent tip-in, even before any indication of pre-ignition is received, additional pre-ignition events can be averted in advance of entering into engine operating conditions that typically trigger pre-ignition. In one example, enriching the engine during the subsequent tip-in includes maintaining the degree of enrichment applied during the enriching responsive to the indication of pre-ignition. Although in other embodiments, the enrichment may be completed during the subsequent tip-in by performing the remainder number of enrichment cycles at a lower degree of richness.

As such, the subsequent or second tip-in (at 228) may be a smaller tip-in than the initial or first tip-in (at 204). For example, during the second tip-in, the operator may displace the pedal by a smaller amount, the boost level desired may be lower, the throttle opening requested may be lower, and/or the final engine speed and/or load requested may be lower (as compared to the respective values that triggered pre-ignition following the first tip-in). The inventors herein have recognized that the engine combustion chamber may have become hot during the conditions leading up to, and following, the pre-ignition event. Consequently, at subsequent tip-ins that are to relatively lower engine loads (e.g., lower than loads that would other trigger pre-ignition), repeated pre-ignition events may be possible during any subsequent tip-in. Herein, the pre-ignition mitigating enrichment initiated during a first tip-in (but not completed before a subsequent tip-out) may be completed during one or more subsequent tip-ins to reduce the thermal loading of the engine. Specifically, by preemptively enriching the engine while depleting the enrichment cycles stored in the "piggy bank", repeated pre-ignition events that can occur during subsequent tip-ins can be mitigated, including tip-ins at/to low engine loads.

In one example, in response to an indication of pre-ignition during a first, longer tip-in, a controller may enrich the engine for a duration of the first tip-in. For example, the engine may be enriched over a fraction of the entire duration of the first tip-in with the enrichment completed before a subsequent tip-out event occurs. In comparison, in response to an indication of pre-ignition during a second, shorter tip-in, the controller may enrich the engine for a duration of the second tip-in, and further enrich the engine during a third tip-in following the second tip-in. Herein, the enrichment initiated in response to the second tip-in may not be completed before a subsequent tip-out event occurs. Thus, the enriching for a duration of the second tip-in includes enriching until a tip-out following the second tip-in, and then continuing or completing the enriching during the third tip-in, wherein the third tip-in is at a lower engine load than the second and the first tip-in.

In the above example, the enriching performed during the third tip-in includes enriching that is preemptively performed, without receiving any indication of pre-ignition during the third tip-in. The enriching performed during the third tip-in may be based on a difference between a number of enrichment cycles performed during the second tip-in and a threshold number of enrichment cycles, the threshold number based on the indication of pre-ignition during the second tip-in. Further, the third tip-in may include a smaller pedal displacement than the second tip-in (e.g., to a lower load condition, or lower torque demand).

In this way, pre-ignition mitigating enrichment operations may be completed and recurrent pre-ignition due to repeated tip-ins following a pre-ignition event can be reduced. An example enrichment adjustment is shown with reference to FIG. 4.

Figure 3:
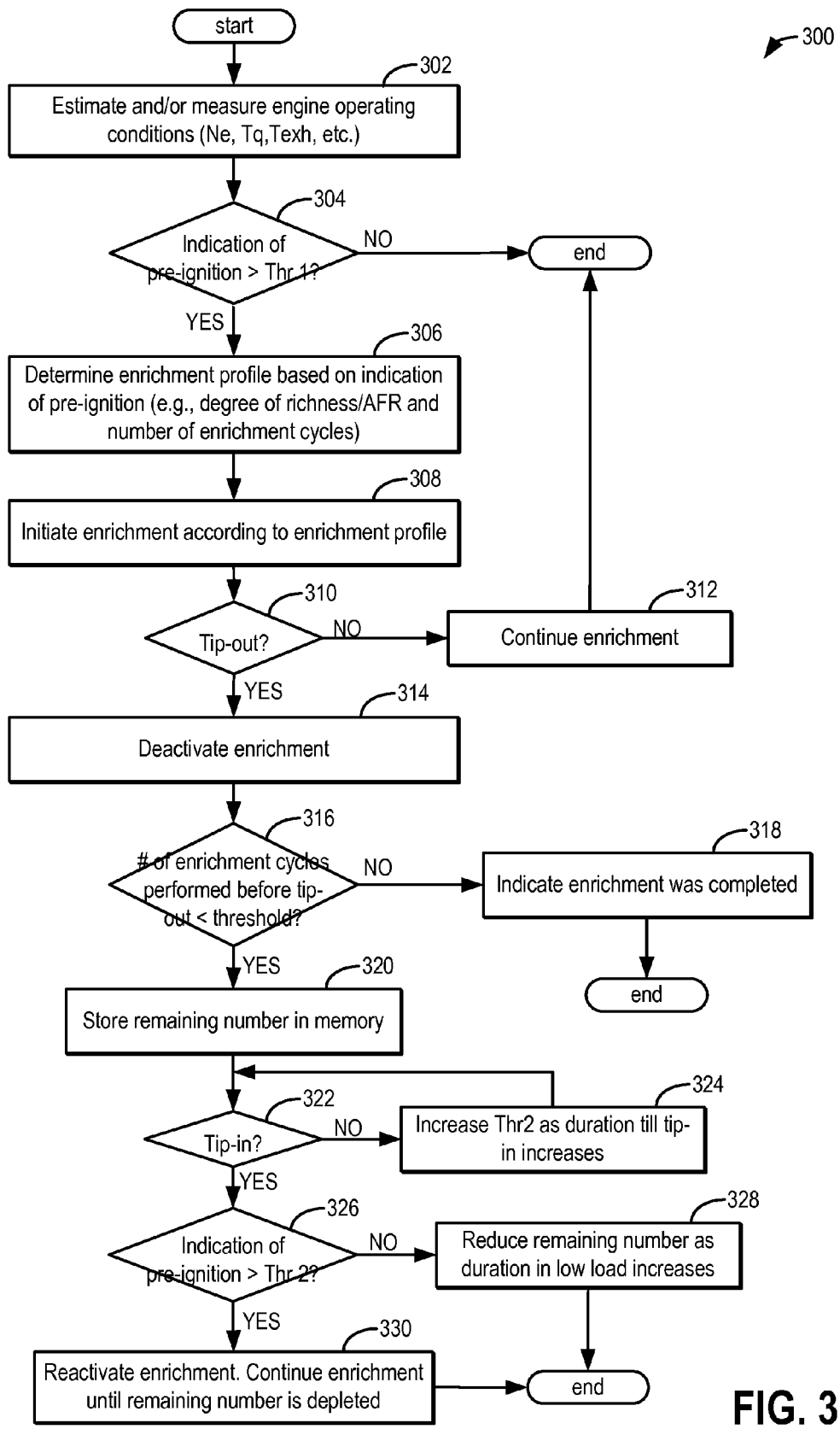

Now turning to FIG. 3, another example routine 300 is depicted for adjusting a pre-ignition mitigating engine enrichment based on tip-in events following an initial pre-ignition event. In particular, the routine of FIG. 3 adjusts load thresholds at which a pre-ignition mitigating enrichment is triggered during repeated tip-in events following an initial pre-ignition event. This routine, like the routine of FIG. 2, allows thermal loading of the engine to be reduced, thereby lowering the likelihood of further pre-ignition events.

At 302, as at 202, engine operating conditions may be estimated and/or measured, including, for example, engine speed and load, torque, boost, manifold pressure (MAP), manifold aircharge temperature (MCT), exhaust temperature, air-fuel ratio (lambda), fuel octane content, PI count, etc.

At 304, the routine includes determining if an indication (e.g., a first indication) of pre-ignition is higher than a first threshold. As an example, it may be determined if a knock sensor output is higher than a first threshold. As another example, it may be determined if engine speed-load conditions are higher than a first threshold where pre-ignition is likely to occur. As elaborated earlier, pre-ignition events can occur in boosted engine operations at heavy loads and low engine speeds. The indication of pre-ignition may include a likelihood of pre-ignition. Alternatively, such as where the first indication of pre-ignition is received during a first tip-in where engine load has suddenly increased due to a vehicle operator applying an accelerator pedal, the indication of pre-ignition may include the detection of a pre-ignition event. Therein the first threshold may include a first engine speed-load threshold that is based on a pre-ignition history of the engine. For example, if the engine has a high PI count and a history of pre-ignition events having occurred and been detected, the first threshold may be lowered so as to enable incipient pre-ignition to be detected earlier, and mitigating steps to be taken earlier. If the first indication of pre-ignition is not higher than the first threshold, the routine may end. As such, the first indication of pre-ignition not being higher than the first threshold indicates that pre-ignition is not likely under the given engine speed-load conditions and/or that a pre-ignition event has not occurred.

At 306, in response to the first indication of pre-ignition being higher than the first threshold, the routine includes determining an enrichment profile for enriching the engine. As elaborated with reference to FIG. 2 (at 212), this includes determining and adjusting a degree of enrichment and a number of enrichment cycles based on the indication of pre-ignition. For example, as the first indication of pre-ignition increases, the enrichment may be increased. This may include, for example, increasing a degree of richness of the enrichment to an air-fuel ratio that is more rich than stoichiometry. Additionally, this may include increasing a number of enrichment cycles applied in response to the first indication of pre-ignition. In addition, a number of engine cylinders to be enriched may be determined. In one example, in response to the first indication of pre-ignition, only the pre-ignition affected cylinder(s) may be enriched. In an alternate example, in response to the first indication of pre-ignition as well as the pre-ignition history of the engine, one or more additional cylinders, including cylinders not affected by pre-ignition, may be enriched. By enriching the engine in response to the indication of pre-ignition, charge cooling is achieved, in-cylinder temperatures are rapidly lowered, thermal loading of the engine is reduced, and the risk of further pre-ignition events is decreased.

At 308, the routine includes initiating the engine enrichment as per the enrichment profile determined at 306. For example, direct fuel injection of a fuel to the engine cylinder(s) may be increased to run the engine richer than stoichiometry. The controller may then continue to enrich the engine until a tip-out event. For example, where the first indication of pre-ignition is received during a first tip-in, the enriching of the engine may be continued until a tip-out following the first tip-in.

The controller may include a counter, or "piggy bank", for counting the progression of enrichment cycles. In one example, as the number of enrichment cycles completed increases, a progress number on the counter may be increased. As a further example, as the number of enrichment cycles completed increases, a remainder number on the counter (indicating the number of enrichment cycles of the enrichment profile remaining) may be decreased.

At 310, it may be determined if a tip-out event has occurred. For example, it may be determined if the vehicle operator has demanded decreased torque by releasing the accelerator pedal. If a tip-out event is not confirmed, at 312, the routine includes continuing enriching the engine as per the enrichment profile. As the enrichment progresses, the number on the progress counter may be increased while the remainder number of the counter may be decreased. Alternatively, the number in the enrichment "piggy bank" may be decreased as a number of enrichment cycles of the enrichment profile are depleted.

As such, during a tip-out event, due to release of the accelerator pedal, boost levels may be decreased, throttle opening may be decreased, and intake manifold air flow may be decreased. Thus, if a tip-out is confirmed, at 314, to maintain engine operation around stoichiometry, the pre-ignition mitigating enrichment (initiated in response to the first indication of pre-ignition at 308) may be deactivated (if it has not already been completed by the time the tip-out event is confirmed).

At 316, it may be determined if a number of enrichment cycles completed before the tip-out is lower than a threshold number. For example, based on the progress number and the remainder number on the controller's counter, it may be determined if all the enrichment cycles of the enrichment profile have been completed. If the number is not lower than the threshold number, then at 318, it may be determined that the pre-ignition mitigating enrichment was completed. The threshold number applied at 316 may be based on the indication of pre-ignition during the first tip-in, the threshold number increased as the indication of pre-ignition increases.

If the number of enrichment cycles completed before tip-out is lower than the threshold number, the controller may complete the enrichment, opportunistically, during one or more subsequent tip-in events. As elaborated below, during a subsequent tip-in event, where engine speed and load is increased to a level, such as to a level where pre-ignition is likely, the remaining enrichment cycles may be completed (or depleted) to preemptively reduce the risk of pre-ignition.

Specifically, at 320, the controller may store the remaining number of enrichment cycles (to be completed) in its memory. For example, the remaining number may be stored in an enrichment "piggy bank" until selected conditions are met for depleting the stored enrichment cycles.

At 322, a subsequent tip-in may be confirmed, for example, based on an accelerator pedal position and an operator torque demand. If a tip-in is confirmed, then at 326, it may be determined if there is a (second) indication of pre-ignition, and further if the second indication of pre-ignition is higher than a second threshold (Thr2), lower than the first threshold (Thr1) used to assess the first indication of pre-ignition (at 304). As such, the subsequent tip-in may be a second tip-in, and the second indication of pre-ignition may include a likelihood of pre-ignition during the second tip-in. For example, the second threshold may be a second engine speed-load threshold that is lower than the first engine speed-load threshold, and it may be determined if the speed-load conditions at the second tip-in are high enough that pre-ignition is likely, but has not yet occurred.

The inventors herein have recognized that the engine combustion chamber may have become hot during the conditions leading up to, and following, the first indication of pre-ignition at 304. Consequently, at subsequent tip-ins, repeated pre-ignition events may be more likely, even at lower engine speed-load conditions than those that triggered the initial pre-ignition event. Thus, to reduce the likelihood of recurrent pre-ignition during subsequent tip-ins, the engine controller may lower the second threshold relative to the first threshold so that the completion of the remaining number of enrichment cycles is triggered at lower speed-load conditions, when pre-ignition is possible, but before an actual pre-ignition event occurs. The second threshold may be adjusted based on the first threshold and further based on a number of enrichment cycles completed before the tip-out. As such, the number of enrichment cycles completed affects the engine cooling, with more engine cooling reducing the risk of further pre-ignition at subsequent tip-in events. In one example, as the number of enrichment cycles completed decreases, the second threshold may be lowered further from the first threshold. Herein, the lower second threshold allows a pre-ignition mitigating enrichment to be initiated at lower engine speed-load conditions. In comparison, as the number of enrichment cycles increases, the second threshold may be returned closer towards the first threshold. Herein, the higher second threshold allows a pre-ignition mitigating enrichment to be initiated at engine speed-load conditions similar to those that triggered the initial pre-ignition event.

As such, if a subsequent tip-in is not confirmed at 322, then at 324, the controller may start a timer and monitor a duration till a subsequent tip-in. Over the duration until the subsequent tip-in occurs, the engine load may reduce, and some engine cooling may be achieved. As a result the likelihood of pre-ignition occurring at a subsequent tip-in may fall. Thus, as the duration until the subsequent tip-in increases, the second threshold (Thr2) may be increased, for example towards first threshold (Thr1). In one example, after a duration has elapsed wherein sufficient engine cooling has occurred, the second threshold may be set to the same value as the first threshold.

Returning to 326, if the second indication of pre-ignition is not higher than the second threshold, the remaining enrichment cycles are not initiated. Further, at 328, as a duration of engine operation at low engine speed-loads, below the second threshold, continues, the remaining number of enrichment cycles to be depleted may be reduced. That is, in response to the second indication of pre-ignition being lower than the second threshold for a duration following the tip-out, the remaining number of cycles corresponding to the difference between the number of enrichment cycles completed before the tip-out and the threshold number may be decreased. Specifically, as the duration increases, it may be inferred that the combustion chamber has cooled to a safe level, and consequently the remaining enrichment cycles may be gradually depleted to zero. While the routine suggests decreasing the remaining number as a duration (in time) of engine operation below the second threshold increases, it will be appreciated that the duration may alternatively be measured in terms of a distance travelled by the vehicle, and/or a number of elapsed engine combustion cycles. It will be appreciated that in still further embodiments, as the duration increases, the second threshold (Thr2) may also be increased, such as towards Thr1.

At 330, in response to the second indication of pre-ignition being higher than the second threshold, the routine includes enriching the engine. Specifically, enrichment may be reactivated and performed until a remaining number of enrichment cycles are depleted. In other words, the remaining number of enrichment cycles stored in the "piggy bank" following the first indication of pre-ignition (being higher than the first threshold) are depleted in response to the second indication of pre-ignition (being higher than the second threshold). Herein, the pre-ignition mitigating enrichment initiated (but not completed) responsive to the first indication of pre-ignition may be completed during one or more subsequent tip-ins to reduce the thermal loading of the engine. Specifically, by preemptively enriching the engine in response to the second indication of pre-ignition, at lower engine speed-load conditions than the first indication of pre-ignition, the enrichment cycles stored in the "piggy bank" are depleted and repeated pre-ignition events that can occur during subsequent tip-ins can be mitigated, including at tip-ins where engine speed-load conditions are lower. For example, the enrichment may be continued during the subsequent tip-in until the remainder number on the controller's counter comes to zero, and then the engine may be operated at or around stoichiometry (or an alternate nominal air-fuel ratio that is based on the operating conditions).

It will be appreciated that when enriching the engine following the second indication of pre-ignition, the degree of enrichment applied during the enriching following the first indication of pre-ignition may be maintained. However, in other embodiments, the enrichment may be completed by performing the remainder number of enrichment cycles at a different (e.g., lower) degree of richness. For example, as a duration of time elapsed between the tip-out (following the first indication of pre-ignition) and the second indication of pre-ignition increases, a degree of richness of the enriching responsive to the second indication of pre-ignition may be decreased, towards stoichiometry (relative to the degree of richness of the enriching responsive to the first indication of pre-ignition). Herein, based on the longer duration between the first and second indications of pre-ignition, it may be inferred that an amount of combustion system cooling has occurred and a propensity for pre-ignition has correspondingly decreased, thereby requiring a relatively less rich pre-ignition mitigating enrichment. In other embodiments, the combustion chamber cooling may be inferred based on cylinder temperature or pressure, or other factors, and the degree of richness for the enrichment following the second indication of pre-ignition (or additional subsequent indications of pre-ignition) may be correspondingly decreased towards stoichiometry.

It will be appreciated that if the remainder number of enrichment cycles are not fully depleted at 326, for example due to a tip-out occurring before the remainder number is completed, the controller may update the new remainder number in the memory and wait for a third indication of pre-ignition which is higher than a corresponding threshold to deplete the remaining enrichment cycles, and so forth. Thus, the enrichment initiated in response to a first indication of pre-ignition may be completed over one or more subsequent tip-in events.

In further embodiments of the routines of FIGS. 2-3, the enrichment performed during the one or more subsequent tip-ins may be adjusted based on a duration of each tip-in (e.g., based on an amount of time elapsed between a given tip-in and a subsequent tip-out), a frequency of tip-in events following a pre-ignition event, a frequency of pre-ignition event (e.g., based on the pre-ignition history), etc.

As an example, during a first tip-in, a controller may enrich the engine in response to an indication of pre-ignition being higher than a first threshold. Then, if the number of pre-ignition events between the first tip-in and a subsequent tip-out is higher than a threshold number, during a second tip-in following the tip-out, the engine may be enriched preemptively, before an indication of pre-ignition is received.

As another example, in response to an indication of pre-ignition, an engine may be enriched, with the enrichment adjusted based on a frequency of tip-in events following the indication of pre-ignition. Therein, a number of enrichment cycles may be increased as the frequency of tip-in events increases. Herein, by preemptively enriching the engine when tip-in events recur following a pre-ignition event, excess thermal loading is reduced, thereby reducing the likelihood of pre-ignition being triggered at even relatively low engine load conditions.

In one example, a vehicle system comprises an engine, a pedal for receiving an input from a vehicle operator, a boosting device for providing a boosted aircharge to the engine responsive to the input, a knock sensor coupled to a block of the engine, and a fuel injector for delivering fuel to the engine. The vehicle system may further include a controller with computer readable instructions for indicating pre-ignition based on the knock sensor, such as based on an output of the knock sensor being higher than a threshold. In response to the indication of pre-ignition being received during a pedal tip-in, the controller may enrich the engine, the enrichment adjusted based on the indication of pre-ignition and further based on a duration between the tip-in and a subsequent tip-out. The controller may increase a number of enrichment cycles as the indication of pre-ignition increases, and perform all the number of enrichment cycles over the tip-in when the duration is longer. In comparison, when the duration is shorter, the controller may performing a portion of the number of enrichment cycles over the tip-in and a remaining portion of the number of enrichment cycles over a subsequent tip-in following the tip-out. As such, during the subsequent tip-in, the output of the knock sensor may be lower than the threshold.

Now turning to FIG. 4, map 400 depicts an example enrichment profile of a pre-ignition mitigating enrichment. Specifically, map 400 depicts operator pedal position (PP) at plot 402, knock sensor output at plot 404, and combustion air-fuel ratio (AFR) relative to stoichiometry (407) at plot 406.

Prior to t1, the engine may be operating at lower engine speed and load conditions. At t1, the accelerator pedal (plot 402) may be applied by a vehicle operator and a tip-in event may be confirmed. In response to the tip-in event, engine load may be increased. As engine load increases, the propensity for abnormal combustion events, such as knock or pre-ignition events may increase. At t2, the knock sensor output (plot 404) may be higher than a pre-ignition threshold 405, as well a knock threshold (not shown). Accordingly, a pre-ignition event may be confirmed. In response to the indication of pre-ignition, to reduce engine thermal loading, cylinder fueling may be increased relative to aircharge so as to enrich the cylinder. As shown at plot 406, the engine may be operated richer than stoichiometry 407 for a duration following the detection of pre-ignition with a richness based at least on the intensity of the knock sensor output. As such, based on the indication of pre-ignition, it may be determined that an enrichment for a duration from t1 to t3 (and corresponding to the sum of regions 408a, in solid lines, and 408b, in dashed lines) is required to mitigate the pre-ignition. However, at t2, due to a tip-out event, engine air flow and fuel injection may be reduced and the enrichment may not be completed. Specifically, only an amount of enrichment corresponding to region 408a is completed. An amount of enrichment corresponding to region 408b, between t2 and t3, is not completed and therefore this remaining amount of enrichment may be stored in the controller for subsequent depletion. At t2, the engine may be returned to stoichiometric operation.

At t4, a tip-in event may be confirmed. In response to the subsequent tip-in, a pre-ignition mitigating enrichment may be preemptively performed to reduce the likelihood of pre-ignition at the given tip-in. In particular, the pre-ignition mitigating enrichment that was not previously completed may be depleted at the current tip-in. Thus, at t4, an enrichment 409, corresponding to region 408b, may be depleted. The remainder of the enrichment may be depleted by t5, at which time the engine resumes stoichiometric operation. In this way, the pre-ignition mitigating enrichment initiated during a first tip-in is completed during a subsequent tip-in to reduce the likelihood of recurrent pre-ignition during repeated tip-ins.

Now turning to FIG. 5, another example pre-ignition mitigating enrichment is depicted. Map 500 depicts an indication of pre-ignition (PI) at flag 502, a number of pre-ignition mitigating engine cycles available (in a "piggy bank") at plot 504, an amount of air consumed by the engine (Load_fg) at plot 506, and combustion air-fuel ratio (AFR) relative to stoichiometry (stoich.) at plot 508.

At t1, an engine torque demand is increased, for example, in response to a tip-in. In response to the increased torque demand, the engine load and intake aircharge (plot 506) is increased, for example, above a threshold load of 1.0 (dashed line) indicating that the engine is in a turbocharged or boosted operating condition.

At t2, an indication of pre-ignition is received (e.g., pre-ignition is detected or inferred) and a PI flag is set (flag 502). In the depicted example, the flag is set high for a pre-ignition event detected in a single combustion event on a given cylinder.

At t2, in response to the indication of pre-ignition, a number of desired enrichment cycles is determined (plot 504) and stored on a "piggy bank" of the controller. As such, this number corresponds to a number of enrichment cycles desired to mitigate the pre-ignition. Based on the number of enrichment cycles, at t2, a rich air-fuel ratio (plot 508) is scheduled for the pre-ignition affected cylinder and optionally one or more additional cylinder (e.g., all cylinders of the engine). Specifically, the selected cylinders are operated richer than stoichiometry (stoich.; dashed line). As the engine is operated at the rich AFR, a number of enrichment cycles in the "piggy bank" are consumed. As the engine load stays high between t2 and t3, enrichment is continued.

At t3, engine load is decreased below a threshold, for example, due to a tip-out event. When the load is decreased, the enrichment is deactivated and the number of enrichment cycles in the "piggy bank" are held constant. As such, the number is held constant between t3 and t4 while the engine load remains at moderate loads (e.g., below a threshold load) and the engine is operated at stoichiometry.

At t4, an increased load is demanded again, for example, due to another tip-in. In response to the increased load demand, the enrichment is reactivated. However, the enrichment is triggered at a lower load threshold than the typical pre-ignition strategy enabling conditions (such as the load threshold applied at t2). By lowering the threshold at which the enrichment is reactivated, the combustion chamber can be preemptively kept cool and additional pre-ignition events can be avoided.

Thus, after t4, the engine is once again operated at richer than stoichiometry. As the enrichment is used, the number of enrichment cycles available in the "piggy bank are used up until at t5, all the enrichment cycles have been depleted. Once the enrichment cycles are depleted at t5, the air-fuel ratio is returned to stoichiometry (or a nominal air-fuel ratio for the given engine operating conditions). As such, if another pre-ignition event is encountered after t5, the enrichment strategy would be re-armed and the enrichment cycles available in the "piggy bank" would be refilled based on the most recent indication of pre-ignition so that they are available for use.

It will be appreciated that while the depicted example shows the number of enrichment cycles in the "piggy bank" being held constant between t3 and t4, in alternate embodiments, the number may be decayed at a slow controlled rate that is proportional to the time elapsed in the low load condition, or based on an inference of combustion chamber cooling over the duration. For example, as shown by segment plot 505 (dashed line), the enrichment cycle number may be slowly decayed between t3 and t4 such that at t4, the remaining number is smaller than the corresponding number at t3. In such an embodiment, when a higher load condition is confirmed at t4, the engine may be once again operated at richer than stoichiometry and the number of enrichment cycles remaining in the "piggy bank" at t4, after the time controlled decay of the number between t3 and t4, may be gradually depleted (plot 505, dashed line) until all cycles are depleted at or before t5 (as based on the number of enrichment cycles remaining at t4 and the enrichment air-fuel ratio applied between t4 and t5). It will also be appreciated that while the depicted example shows the degree of richness of the enrichment cycles between t4 and t5 being the same as the degree of richness of the enrichment cycles between t2 and t3 (plot 508, solid line), in an alternate example, the air-fuel ratio (AFR) to be applied at the subsequent tip-in (at t4) may start at the same AFR as when exiting the tip-out (at t3) and may be gradually reduced (towards stoichiometry) as a function of time, or an inference of combustion chamber cooling, while operating at the low load conditions. For example, as a duration of operating at low to moderate loads increases, the enrichment at the subsequent tip-in may be initiated at an AFR that is less rich than the AFR applied during the enrichment at the first tip-in. In one example, when a duration between t3 and t4 is shorter, such that there is not enough combustion chamber cooling, the enrichment AFR at t4 may follow the same enrichment AFR as at t2, as shown at plot 508. In comparison, when the duration between t3 and t4 is longer, such that there is some combustion chamber cooling, the enrichment AFR at t4 may be reduced from the enrichment AFR at t2, as shown at plot 509 (dashed line).

In another example, wherein the increased load at t1 is responsive to an initial tip-in, the enriching the engine during the subsequent tip-in at t4 may include adjusting a degree of enrichment based on a duration elapsed between the tip-out (at t3) and the subsequent tip-in (at t4), the degree of enrichment of the enriching during the subsequent tip-in decreased relative to a degree of enrichment of the enriching during the initial tip-in as the duration elapsed increases.

In still further examples (not shown), the enrichment at t4 may be initiated with the same AFR as the enrichment before exiting at the tip-out (at t3) and the AFR may be gradually decreased towards stoichiometry between t4 and t5 such that a higher degree of richness is applied at t4 and a lower degree of richness is applied at t5. For example, the increase in load at t1 may be responsive to an initial tip-in and the enriching during the initial tip-in may be at an initial degree of richness. Then, the enriching during the subsequent tip-in (at t4) may include starting the enriching at the initial degree of richness and decreasing the degree of richness over a duration of the subsequent tip-in.

FIG. 6 shows yet another example pre-ignition mitigating enrichment. As with FIG. 5, map 600 depicts an indication of pre-ignition (PI) at flag 602, a number of pre-ignition mitigating engine cycles available (in a "piggy bank") at plot 604, an amount of air consumed by the engine (Load_fg) at plot 606, and combustion air-fuel ratio (AFR) relative to stoichiometry (stoich.) at plot 608.

At t11, an engine torque demand is increased, for example, in response to a tip-in. In response to the increased torque demand, the engine load and intake aircharge (plot 606) is increased, for example, above a threshold load of 1.0 (dashed line) indicating that the engine is in a turbocharged or boosted operating condition.

At t12, an indication of pre-ignition is received (e.g., pre-ignition is detected or inferred) and a PI flag is set (flag 602). In the depicted example, the flag is set high for a pre-ignition event detected in a single combustion event on a given cylinder.

At t12, in response to the indication of pre-ignition, a number of desired enrichment cycles is determined (plot 604) and stored on a "piggy bank" of the controller. As such, this number corresponds to a number of enrichment cycles desired to mitigate the pre-ignition. Based on the number of enrichment cycles, at t12, a rich air-fuel ratio (plot 608) is scheduled for the pre-ignition affected cylinder and optionally one or more additional cylinder (e.g., all cylinders of the engine). Specifically, the selected cylinders are operated richer than stoichiometry (stoich.; dashed line). As the engine is operated at the rich AFR, a number of enrichment cycles in the "piggy bank" are consumed. As the engine load stays high between t12 and t13, enrichment is continued.

At t13, engine load is decreased below a threshold, for example, due to a tip-out event. When the load is decreased, the enrichment is deactivated and the number of enrichment cycles in the "piggy bank" are held constant. It will be appreciated that while the depicted example (plot 608, solid line) shows shifting from the rich AFR to stoichiometry (at t13) substantially immediately, in alternate examples, the enrichment may be ramped from the rich AFR to stoichiometry in response to the reduced load condition, at t13, gradually (as shown at segment 609, dashed line). Further still, while the depicted example shows maintaining the AFR between t12 and t13 (plot 608), in alternate examples, the enrichment may be ramped down between t12 and t13 based on an indication of cylinder cooling (as shown in segment 610, dashed and dotted line). Specifically, the level of enrichment may be ramped down during the action between t12 and t13 as sufficient cylinder cooling occurs. This allows for further improvements in fuel economy without compromising the efficiency of pre-ignition mitigation.

In the example of FIG. 6, the load is decreased and held at the moderate load for a much longer period of time (t13-t14 in FIG. 6 is longer than t3-t4 in FIG. 5). Based on the time spent in the moderate load condition being longer than a threshold duration, or based on an alternate inference of the combustion chamber cooling to a safe level, the number of enrichment cycles available in the "piggy bank" are allowed to decay away gradually to zero. For example, the number of enrichment cycles may be decayed based on a time constant that is a factor of elapsed time, elapsed miles, or elapsed number of combustion cycles. In the present example, the number is decayed between t14 and t15 until no enrichment cycles remain at t15. Thus, after t15, engine operation is resumed at stoichiometry (or a nominal air-fuel ratio for the given engine operating conditions). As such, if another pre-ignition event is encountered after t15, the enrichment strategy would be re-armed and the enrichment cycles available in the "piggy bank" would be refilled based on the most recent indication of pre-ignition so that they are available for use.

In this way, pre-ignition induced during tip-in events following an incomplete pre-ignition mitigating enrichment are reduced. By completing the enrichment over one or more subsequent tip-in events, including tip-in events to loads levels that are lower than load levels that typically induce pre-ignition, combustion chamber temperatures may be preemptively reduced. By lowering the temperature of the chamber, thermal overloading of the engine is preemptively reduced. As such, this allows a pre-ignition event to be mitigated while also enabling further pre-ignition events to be averted. Overall, engine degradation is lowered.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during a tip-in, in response to an indication of pre-ignition, enriching the engine until a subsequent tip-out; and
if a number of enrichment cycles between the tip-in and the tip-out is lower than a threshold, enriching the engine during a subsequent tip-in.

2. The method of claim 1, wherein enriching the engine until the subsequent tip-out includes enriching the engine between the tip-in with the indication of pre-ignition and an immediately subsequent tip-out, and wherein enriching the engine during the subsequent tip-in includes enriching during the subsequent tip-in before an indication of pre-ignition during the subsequent tip-in.

3. The method of claim 1, wherein the threshold is based on the indication of pre-ignition during the tip-in, the threshold increased as the indication of pre-ignition increases.

4. The method of claim 2, wherein the subsequent tip-in follows the tip-out, and wherein enriching the engine during the subsequent tip-in includes deactivating the enriching on the tip-out, and reactivating the enriching the engine on the subsequent tip-in based on a difference between the threshold and the number of enrichment cycles performed between the tip-in with the indication of pre-ignition and the subsequent tip-out.

5. The method of claim 4, wherein enriching the engine until the subsequent tip-out includes adjusting a degree of enrichment based on the indication of pre-ignition, and wherein enriching the engine during the subsequent tip-in includes maintaining the degree of enrichment.

6. The method of claim 1, wherein the subsequent tip-in is smaller than the first tip-in.

7. The method of claim 1, wherein the tip-in is an initial tip-in, and wherein enriching the engine during the subsequent tip-in includes adjusting a degree of enrichment based on a duration elapsed between the tip-out and the subsequent tip-in, the degree of enrichment of the enriching during the subsequent tip-in decreased relative to a degree of enrichment of the enriching during the initial tip-in as the duration elapsed increases.

8. The method of claim 1, wherein the tip-in is an initial tip-in and wherein the enriching during the tip-in is at an initial degree of richness, and wherein the enriching during the subsequent tip-in includes starting the enriching at the initial degree of richness and decreasing the degree of richness over a duration of the subsequent tip-in.

9. An engine method, comprising:
enriching an engine until a tip-out in response to a first indication of pre-ignition being higher than a first threshold; and
if a number of enrichment cycles completed before the tip-out is lower than a threshold number, during a subsequent tip-in, enriching the engine in response to a second indication of pre-ignition being higher than a second threshold, lower than the first threshold.

10. The method of claim 9, wherein the first indication of pre-ignition is during a first tip-in and includes a pre-ignition event, and wherein the first threshold includes a first engine speed-load threshold, the first threshold based on a pre-ignition history of the engine.

11. The method of claim 10, wherein the subsequent tip-in is a second tip-in, and wherein the second indication of pre-ignition includes a likelihood of pre-ignition during the second tip-in, before a pre-ignition event actually occurs, and wherein the second threshold includes a second engine speed-load threshold, the second threshold adjusted based on the first threshold and further based on the number of enrichment cycles completed before the tip-out.

12. The method of claim 11, wherein enriching the engine during the subsequent tip-in includes enriching the engine based on a difference between the number of enrichment cycles completed before the tip-out and the threshold number.

13. The method of claim 12, wherein enriching based on the difference includes enriching for a remaining number of cycles corresponding to the difference, and then operating the engine at or around stoichiometry.

14. The method of claim 13, further comprising, in response to the second indication of pre-ignition being lower than the second threshold for a duration following the tip-out, decreasing the remaining number of cycles.

15. The method of claim 13, further comprising, as a duration elapsed between the tip-out and the second indication of pre-ignition increases, decreasing a degree of richness of the enriching responsive to the second indication of pre-ignition.

16. A method for an engine, comprising:
in response to an indication of pre-ignition during a first, longer tip-in, enriching the engine for a duration of the first tip-in; and
in response to an indication of pre-ignition during a second, shorter tip-in, enriching the engine for a duration of the second tip-in, and further enriching the engine during a third tip-in following the second tip-in.

17. The method of claim 16, wherein enriching during the third tip-in includes enriching without receiving an indication of pre-ignition during the third tip-in.

18. The method of claim 16, wherein the third tip-in includes a smaller pedal displacement than the second tip-in.

19. The method of claim 16, wherein enriching for a duration of the first tip-in includes completing the enriching before a tip-out following the first tip-in, and wherein enriching for a duration of the second tip-in includes enriching until a tip-out following the second tip-in, and then continuing the enriching during the third tip-in.

20. The method of claim 16, wherein further enriching during the third tip-in includes enriching based on a difference between a number of enrichment cycles performed during the second tip-in and a threshold number of enrichment cycles, the threshold number based on the indication of pre-ignition during the second tip-in.

21. A vehicle system, comprising:
an engine;
a pedal for receiving an input from a vehicle operator;
a boosting device for providing a boosted aircharge to the engine responsive to the input;
a knock sensor coupled to a block of the engine;
a fuel injector for direct injecting fuel to the engine; and
a controller with computer readable instructions for:
indicating pre-ignition based on an output of the knock sensor; and
in response to the indication of pre-ignition being received during a pedal tip-in,
increasing direct injection of fuel from the fuel injector in proportion to an amount of air in the engine to enrich the engine, a degree of the enrichment adjusted based on the indication of pre-ignition and further based on a duration between the tip-in and an immediately subsequent tip-out of the pedal.

22. The system of claim 21, wherein adjusting the enrichment includes,
increasing a number of enrichment cycles over which fuel is injected as the indication of pre-ignition increases;
when the duration is longer, performing all the number of enrichment cycles over the tip-in and then deactivating the enrichment; and
when the duration is shorter, performing a portion of the number of enrichment cycles over the tip-in, then deactivating the enrichment in response to the tip-out, and responsive to a subsequent tip-in of the pedal following the tip-out, reactivating the enrichment and performing a remaining portion of the number of enrichment cycles over the subsequent tip-in following the tip-out.

23. The system of claim 22, wherein indicating pre-ignition based on the output of the knock sensor includes the output of the knock sensor being higher than a threshold, and wherein during the subsequent tip-in, the output of the knock sensor is lower than the threshold.

24. An engine method, comprising:
during a first tip-in, enriching an engine in response to an indication of pre-ignition being higher than a first threshold; and
if a number of pre-ignition events between the first tip-in and a subsequent tip-out is higher than a threshold number, during a second tip-in following the tip-out, enriching the engine before an indication of pre-ignition.

25. An engine method, comprising:
in response to an indication of pre-ignition, enriching an engine; and
adjusting the enrichment based on a frequency of tip-in events following the indication of pre-ignition.

26. The method of claim 25, wherein the adjusting includes, increasing a number of enrichment cycles as the frequency of tip-in events increases.

* * * * *